Patented Jan. 6, 1925.

1,521,607

UNITED STATES PATENT OFFICE.

JOSEPH L. DIXON, OF WOLVERHAMPTON, ENGLAND, ASSIGNOR TO BARTON R. SHOVER, OF PITTSBURGH, PENNSYLVANIA.

METHOD OF EXTRACTING AND RECOVERING VANADIUM.

No Drawing.    Application filed January 31, 1922.   Serial No. 533,026.

*To all whom it may concern:*

Be it known that I, JOSEPH L. DIXON, a subject of the King of England, residing at 88 Darlington Street, Wolverhampton, England, have invented certain new and useful Improvements in Methods of Extracting and Recovering Vanadium, set forth in the following specification.

This invention relates to the extraction and recovery of vanadium from certain ores. Large deposits of iron ores exist which contain vanadium in small but appreciable quantities, and it is the primary object of my invention to provide a novel method of treating the ores from which the vanadium is extracted, in a cheap, effective and practical manner.

Most of such vanadium bearing iron ores are titaniferous, a typical composition thereof being as follows—

|        | Per cent. |
|--------|-----------|
| $Fe_3O_4$ | 77 |
| $SiO_2$ | 10 |
| $TiO_2$ | 12 |
| $V_2O_5$ | 1 |

It will be seen from the foregoing that ores of the above composition contain 56 per cent of metallic iron and 0.56 per cent of metallic vanadium, and that in treating such ores by a simple process of reduction the resulting product will contain not more than 1 per cent vanadium. However, if the novel reduction method of this application be used, an alloy containing a much greater percentage of vanadium will be produced.

On account of the high titanic acid content of ores similar to that of the composition given above, they can not be smelted economically in a blast furnace, but on the other hand such ores can readily be smelted and reduced to the metallic state in an electric furnace. As a result of electrically smelting an ore of the above composition, together with suitable reducing and fluxing materials, there will be produced a pig iron of the following composition—

|     | Per cent. |
|-----|-----------|
| Fe  | 94 |
| Si  | 1.2 |
| V   | 0.9 |

In addition there will be present small proportions of other elements, such as carbon, manganese, titanium, and the impurities sulfur and phosphorus, but these are not material to the present description.

According to my invention, pig iron of the above composition is submitted to oxidizing influences in a suitable furnace so that there is obtained a slag containing a much higher proportion of vanadium oxide than the original ore. For example, if such pig iron is blown in a Bessemer converter, and converted into soft steel, the resulting slag will approximate the following composition—

|         | Per cent. |
|---------|-----------|
| $SiO_2$ | 50 |
| $V_2O_5$ | 25 |
| FeO | 25 |

Such a slag can be converted into the well known alloy ferro vanadium, by using ferro silicon or aluminum as a reducing agent.

Alternatively the pig iron can be oxidized in an open-hearth or similar type of furnace so as to obtain a slag containing a valuable proportion of vanadium.

I prefer, however, to carry out the oxidation of the pig iron in two or more stages, the object of the first stage being to oxidize the silicon, and of the later stage or stages to oxidize the vanadium. The silicon is more easily oxidized than the vanadium, and therefore, in the first stage, the oxidation of the pig iron can be stopped when the greater portion of the silicon is oxidized and when the greater portion of the vanadium is still in the metallic state and dissolved in the pig iron. At this stage in the process the slag containing the silicon as $SiO_2$ is separated from the metal, and the oxidation of the metal is then continued until the vanadium is oxidized and dissolved in a further slag. The object of conducting the oxidation in two stages is to obtain the vanadium in a slag as small in bulk as possible and substantially free from silica.

As it is not possible to conduct the process so that oxidation of the silicon is completed before the oxidation of the vanadium is begun, the siliceous slag resulting from the first stage of the oxidation will contain an appreciable proportion of vanadium. This slag, while removed from the bath, is not discarded, but is added to a subsequent charge of ore for reduction into pig iron, and in this way the vanadium contained in the slag is recovered by being reduced to its metallic state and dissolved in the pig iron.

The object of a possible third stage in the oxidation may be explained as follows—

After the completion of the oxidation by which the greater portion of the vanadium is extracted from the metal there will still be traces of vanadium in the metallic bath, and these traces can only be removed by a very intense oxidation, that is, by a further long continued oxidation.

Such long continued or intense oxidation will yield a slag containing an appreciable proportion of vanadium, and also iron oxide in such large proportion as to render the slag unsuitable for smelting directly into ferro-vanadium. The vanadium in this slag can be recovered by mixing the slag with the materials for a subsequent smelting of the ore, or by using it in the earlier stages of oxidizing a subsequent charge of pig iron. The desirability or undesirability of continuing the oxidation into this stage will depend largely upon the qualities that are desired in the metallic bath. For example, if a soft steel is required it will be necessary to carry the oxidation into the third stage in order to remove the carbon dissolved in the metal.

The operations of oxidizing the metal according to the two or three stages which I have described can be carried on in the same or in separate furnaces. For example, the first stage of the oxidation, namely, that for the removal of silicon can be very conveniently performed in a Bessemer converter. The second stage of the oxidation, namely, that for the oxidation of the larger proportion of the vanadium can be conveniently performed in an open-hearth furnace, and more especially an open-hearth furnace having a basic lining.

Having regard, however, to the economic conditions under which the metallurgical operations I have described are conducted, it is preferable that the operation of oxidizing the pig iron to be performed entirely in an electric arc furnace of the tilting type and with a basic lining. In a furnace of this kind the metallurgical operations are most easily carried on and also the separation from the metal of the various slags is greatly facilitated. Accordingly, the performance, in an electric furnace, of the operations which have been outlined, will now be described in greater detail, but it is to be understood that in doing so, the scope of my invention is not to be limited to the exact details disclosed, nor to the exclusive use of an electric furnace.

Assuming that an electric furnace of one ton capacity is to be used, then 2,000 pounds of molten pig iron are poured into the furnace. The electrodes are lowered and the current switched on and 50 pounds of lime are then thrown into the furnace, and as soon as this is heated to a slag forming temperature, hematite iron ore is added cautiously, which will rapidly oxidize the silicon, forming a siliceous slag. When the fracture of a sample of the metal indicates that the metal contains approximately 0.2 per cent silicon (Si) the addition of ore is stopped. The furnace is then tilted towards the spout and the slag removed by raking. This slag will have approximately the following composition—(CaO—50 per cent, $SiO_2$—40 per cent, $V_2O_5$—4 per cent, FeO—6 per cent), and, as previously described, this slag is added to a subsequent charge of iron ore for reduction into pig iron.

After the removal of the siliceous slag about 50 pounds of lime is thrown into the metal and the heating continued. Cautious additions of hematite ore are then made and are allowed time to react with the metal, so as to form an additional slag. When sufficient ore has been added and a sufficient time interval has elapsed, this slag is removed by raking. It is this slag that contains nearly the whole of the vanadium that was contained in the original pig iron. The composition of this slag will be approximately CaO—55 per cent, $V_2O_5$—25 per cent, FeO—11 per cent, $SiO_2$—9 per cent. This slag is subsequently reduced into the well known alloy ferro-vanadium, by smelting in an electric furnace with ferro-silicon as a reducing agent.

At this stage the metallic bath will contain about .02 per cent Si and .08 per cent V, and by further oxidation a further recovery of vanadium can be made. To accomplish this purpose, thirty pounds of lime are added to the bath, and shortly afterward ore additions are made until the bath is completely oxidized. The resulting slag will have the following approximate composition CaO—60 per cent, FeO—36 per cent, $V_2O_5$—4 per cent. This slag is added to a subsequent charge of ore for reduction into pig iron and its vanadium so recovered. Alternatively it is used in place of or mixed with hematite ore for carrying on the preliminary oxidation of a subsequent charge of pig iron for the removal of silicon, in which case the vanadium is recovered by the reducing action of the silicon, according to the equation—

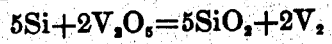
$$5Si + 2V_2O_5 = 5SiO_2 + 2V_2$$

The vanadium reduced from this slag is dissolved in the pig iron and subsequently obtained in the slag of greater concentration resulting from the second stage of the oxidation of the pig iron.

According to circumstances, it may be found more convenient not to continue the oxidation into the third stage, but to cast the metal without further oxidation. Economic requirements may make it convenient to replace the carbon which has been oxidized during the oxidation of the silicon and vanadium by additions of coke or anthracite coal, and to replace the silicon by additions of ferro-silicon. In this way a soft gray iron suitable for foundry purposes will be obtained.

I claim:—

1. The process of extracting vanadium from vanadium bearing iron ores, which consists in reducing the ores to metallic iron, oxidizing said iron so as to form a slag richer in vanadium oxide than the original ore, and subsequently reducing the slag to a metallic alloy containing vanadium.

2. The process of extracting vanadium from vanadium bearing iron ores, which consists in reducing the ore into iron, reducing the iron to a molten state, oxidizing the molten iron so as to obtain a slag richer in vanadium oxide than the original ore, and subsequently reducing the slag so as to obtain a metallic alloy of iron and vanadium with a greater proportion of vanadium relative to iron than was present in the original ore.

3. The process of extracting vanadium from iron or steel, which consists in reducing the iron to a molten state, oxidizing the iron or steel so as to obtain a slag containing a greater proportion of vanadium relative to iron than was present in the original iron or steel, and subsequently reducing the slag into an alloy of iron and vanadium.

4. The process of extracting vanadium from iron containing vanadium and silicon, which consists in reducing the iron to a molten state, partially oxidizing the molten iron so as to oxidize the silicon and form a siliceous slag, separating said siliceous slag from the molten metal, and further oxidizing the remaining metal to oxidize the vanadium content thereof and form a slag containing a higher proportion of vanadium relative to iron than was present in the original iron.

5. The process of extracting vanadium from iron containing vanadium and silicon, which consists in reducing the iron to a molten state, partially oxidizing the molten iron so as to oxidize most of the silicon and form a siliceous slag, separating said siliceous slag from the molten metal, and further oxidizing the remaining metal to oxidize the remaining silicon and vanadium and form a slag containing a higher proportion of vanadium relative to the iron and also the silicon than was present in the original iron.

6. The process of extracting vanadium from pig iron or steel which consists in partially oxidizing the pig iron or steel, so as to obtain part of the vanadium in a slag relatively rich in vanadium oxide and relatively poor in iron oxide, and subsequently recovering substantially the whole of the vanadium remaining in the pig iron or steel by further oxidizing the pig iron or steel, obtaining a second relay richer in vanadium relative to iron than the original pig iron, but poorer in vanadium relative to iron than the first slag.

7. The process of obtaining iron relatively rich in vanadium from iron ores, relatively poor in vanadium, which consists in first reducing a charge of ore into iron and then oxidizing the iron so as to obtain a slag richer in vanadium relative to iron than the original ore, and subsequently mixing the slag with a further charge of ore and reducing the mixture of slag and ore into iron.

8. The process of obtaining iron relatively rich in vanadium from iron relatively poor in vanadium, which consists in first oxidizing a bath of the molten iron so as to obtain a slag richer in vanadium relative to iron than the original iron, and subsequently adding the slag to a second bath of the molten iron.

9. The process of extracting vanadium from an alloy of iron and vanadium, which consists in partially oxidizing the alloy so as to obtain part of the vanadium in a slag relatively rich in vanadium oxide and relatively poor in iron oxide, and subsequently recovering substantially the whole of the vanadium remaining in the alloy by further oxidizing the alloy, obtaining a second alloy richer in vanadium relative to iron than the original alloy, but poorer in vanadium relative to iron than the first slag.

10. The process of obtaining iron alloys relatively rich in vanadium from an ore relatively poor in vanadium, which consists in first reducing a charge of ore into a metallic alloy and then oxidizing the alloy so as to obtain a slag richer in vanadium relative to iron than the original ore, and subsequently mixing the slag with a further charge of ore and reducing the mixture of slag and ore into a metallic alloy.

11. The process of extracting vanadium from vanadium bearing ores, which consists of reducing the ores to metallic iron, reducing the metallic iron to a molten state, heating said iron to a slag forming temperature, adding sufficient hematite ore to oxidize the silicon content of the molten metal and form a siliceous slag, removing the siliceous slag, reheating said metal to a higher temperature, adding lime and sufficient additional hematite ore to said reheated metal to form a second slag containing approximately all of the vanadium content of said ore, and lastly removing said second slag from said molten iron.

In testimony whereof I have hereunto set my hand.

JOSEPH L. DIXON.